(12) United States Patent
Gerhard et al.

(10) Patent No.: US 7,983,512 B2
(45) Date of Patent: Jul. 19, 2011

(54) EMBEDDING LARGE IMAGES WITHIN ONE ANOTHER

(75) Inventors: Lutz Gerhard, Redmond, WA (US); Radoslav P. Nickolov, Redmond, WA (US); David M. Gedye, Redmond, WA (US); Blaise H. Aguera, Redmond, WA (US); Abraham Dunn, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 12/144,661

(22) Filed: Jun. 24, 2008

(65) Prior Publication Data

US 2009/0315914 A1    Dec. 24, 2009

(51) Int. Cl.
*G06K 9/32*    (2006.01)

(52) U.S. Cl. .................. 382/299; 382/305; 707/736

(58) Field of Classification Search .................. 382/299
See application file for complete search history.

(56) References Cited

U.S. PATENT DOCUMENTS

| | | | | |
|---|---|---|---|---|
| 4,797,942 A * | 1/1989 | Burt | | 382/284 |
| 5,278,915 A * | 1/1994 | Chupeau et al. | | 382/236 |
| 5,732,230 A | 3/1998 | Cullen et al. | | |
| 5,742,710 A * | 4/1998 | Hsu et al. | | 382/236 |
| 6,272,235 B1 * | 8/2001 | Bacus et al. | | 382/133 |
| 6,647,125 B2 * | 11/2003 | Matsumoto et al. | | 382/100 |
| 6,668,101 B2 * | 12/2003 | Kaneda | | 382/301 |
| 6,684,087 B1 * | 1/2004 | Yu et al. | | 455/566 |
| 6,882,449 B2 * | 4/2005 | Kimmel et al. | | 358/1.9 |
| 6,972,774 B2 | 12/2005 | Eguchi | | |
| 7,036,079 B2 | 4/2006 | McGlinchey et al. | | |
| 7,075,553 B2 * | 7/2006 | Miller et al. | | 345/598 |
| 7,116,342 B2 | 10/2006 | Dengler et al. | | |
| 7,149,370 B2 * | 12/2006 | Willner et al. | | 382/305 |
| 7,551,182 B2 * | 6/2009 | Bethune et al. | | 345/619 |
| 7,839,421 B2 * | 11/2010 | Bethune et al. | | 345/619 |
| 7,855,752 B2 * | 12/2010 | Baker et al. | | 348/588 |
| 2001/0056418 A1 * | 12/2001 | Youn | | 707/3 |
| 2002/0109729 A1 | 8/2002 | Dutta | | |
| 2004/0215659 A1 * | 10/2004 | Singfield et al. | | 707/104.1 |
| 2004/0252875 A1 * | 12/2004 | Crandall et al. | | 382/133 |
| 2005/0254718 A1 | 11/2005 | Setoguchi | | |
| 2005/0265611 A1 * | 12/2005 | Valadez | | 382/236 |
| 2006/0170693 A1 * | 8/2006 | Bethune et al. | | 345/568 |
| 2007/0252834 A1 * | 11/2007 | Fay | | 345/428 |
| 2007/0297672 A1 | 12/2007 | Eschbach et al. | | |
| 2009/0315914 A1 * | 12/2009 | Gerhard et al. | | 345/630 |

OTHER PUBLICATIONS

Bourke, Paul, "Autostereoscopic Lenticular Images", Date: Dec. 1999, 10 Pages, http://local.wasp.uwa.edu.au/~pbourke/projection/lenticular/.

Rotard, et al., "Zoomable User Interfaces in Scalable Vector Graphics", 10 Pages, http://www.svgopen.org/2007/papers/ZoomableUserInterfacesInSVG/index.html, Apr. 22, 2008.

* cited by examiner

*Primary Examiner* — Sath V Perungavoor

(74) *Attorney, Agent, or Firm* — Joseph R. Kelly; Westman, Champlin & Kelly, P.A.

(57) ABSTRACT

An image processing system embeds at least one image inside a second image. The images are displayed together as a composite image. The first and second images are each tiled and have image pyramids comprising representations at different resolutions formed for them. The image processing system allows a user to zoom into and out of the embedded image, to a desired depth, using its image pyramid.

20 Claims, 10 Drawing Sheets

EMBEDDING LARGE IMAGES WITHIN ONE ANOTHER

BACKGROUND

Image processing on computers is currently very wide spread. While there are a number of different types of image processors currently available, two of them are commonly used. The first is a system, which is commonly used in the area of computer aided design, which employs a vector-based representation of images being processed. This is in contrast to a second type of image processing, which uses a bit mapped representation of images. The present system relates to the second form of image processing, in which the images being processed are represented as bit maps.

Rendering bit map images creates a number of difficulties. For instance, it is not uncommon for a user viewing a bit map image to wish to "zoom in" to view a portion of the image in more detail. There are currently systems available which allow a user to do this. One such system is employed in rendering satellite imagery. The user may obtain a satellite image of an entire country, for instance, and then select a portion of the country to zoom in on, and the satellite image zooms in on that portion of the country by rendering another image of that portion of the country in higher resolution.

The process by which this is done is often referred to as an image pyramid. In creating an image pyramid, the first image is divided into tiles. When the user selects a tile, to zoom into the selected tile, a higher resolution representation of that tile is retrieved from memory and displayed to the user as a second image. The second image is also divided into further tiles. Therefore, when the user wishes to zoom in further, and selects one of the tiles in the second image, then a third image, which is a higher resolution representation of the selected tile, is retrieved and displayed to the user.

In one current system, this is implemented by dividing each image into four quadrants, or tiles. When the user selects one of those tiles, a new image is displayed in which the selected tile is presented at full resolution. The new image is also divided into quadrants (four tiles) and higher resolution images of each of those tiles are stored as well. This can be continued for a number of different levels. Storing images in this way is referred to as using a quad tree to store a pyramid of images at different resolutions. In other words, the pyramid stores pre-tiled imagery of different resolutions of an image. As the user zooms in and out of the image, the image processing system is simply pulling the appropriate jpeg tiles from a server, on demand.

In current systems, using a quad tree to store a pyramid of images at different resolutions has been used to view (zoom in and out of) a single large image. Many current tools used to perform this type of image processing have a fixed size limit on the content that can be generated. In other words, the single large image can only have so many layers in the pyramid.

The discussion above is merely provided for general background information and is not intended to be used as an aid in determining the scope of the claimed subject matter.

SUMMARY

An image processing system embeds at least one image inside a second image. The images are displayed together as a composite image. The first and second images are each tiled and have image pyramids comprising representations at different resolutions formed for them. The image processing system allows a user to zoom into and out of the embedded image, to a desired depth, using its image pyramid.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
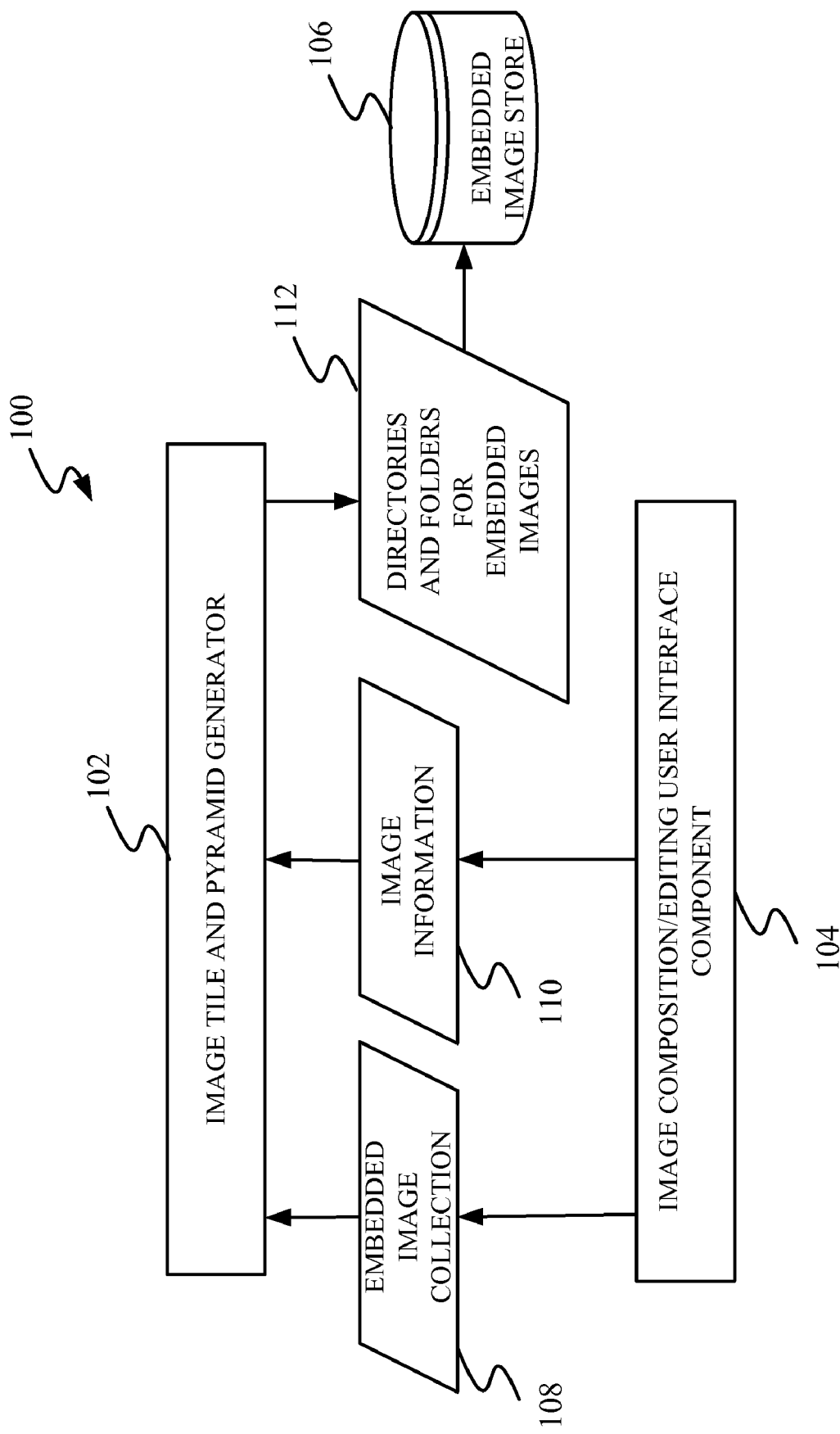
FIG. 1 is a block diagram of one illustrative embodiment of an image processing system.
Figure 2:
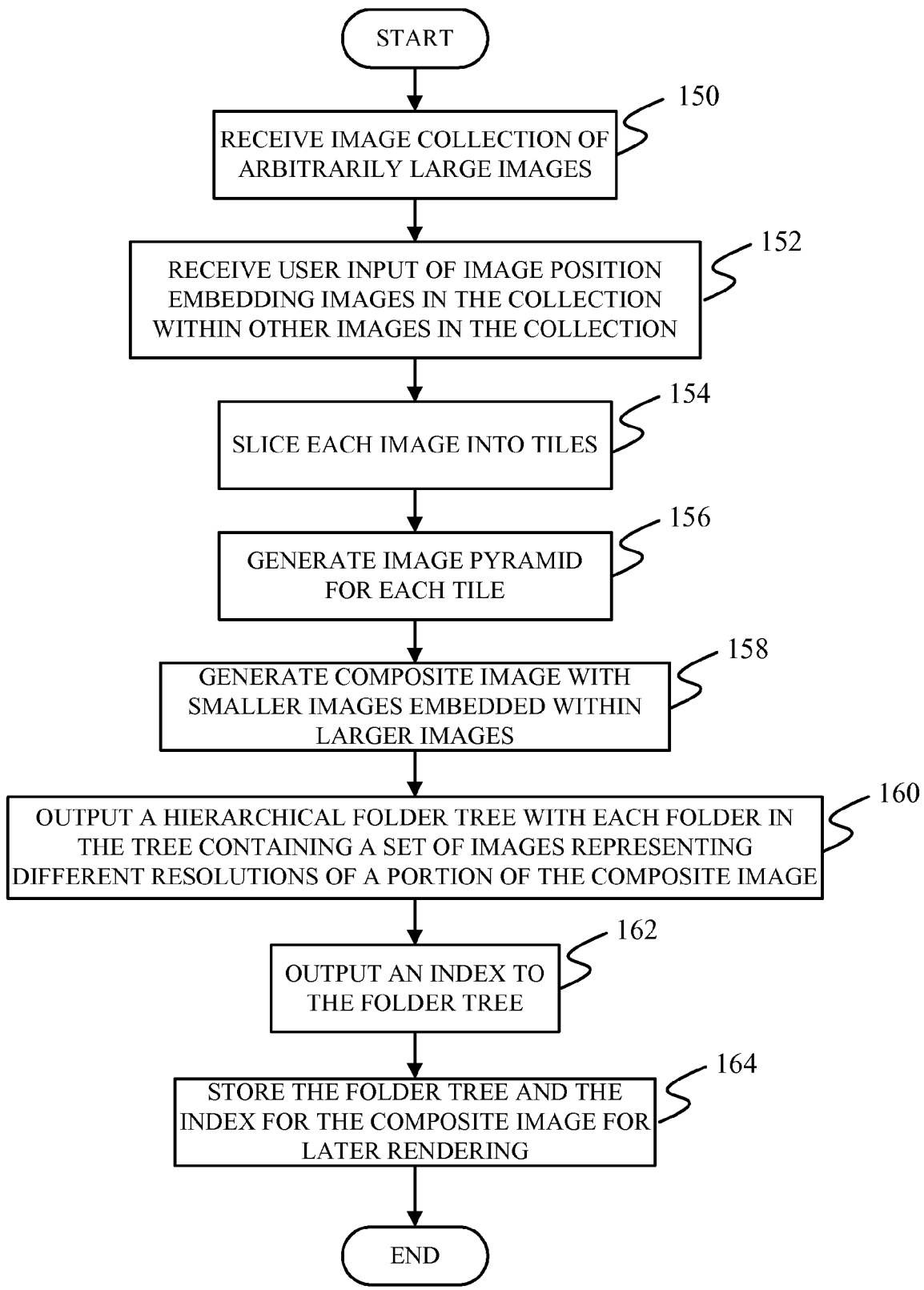
FIG. 2 is flow diagram illustrating one embodiment of the overall operation of the system shown in FIG. 1.

FIG. 1 is a block diagram of one illustrative embodiment of an image processing system 100. Image processing system 100 includes image tile and pyramid generator 102, and image composition/editing user interface component 104. System 100 is also shown coupled to an embedded image store 106. FIG. 2 is a flow diagram illustrating one embodiment of the overall operation of system 100 shown in FIG. 1. FIGS. 1 and 2 will now be described in conjunction with one another.

System 100 is used for processing a collection of images, in order to create arbitrarily large embedded images. In other words, system 100 is illustratively used to allow a user to embed one arbitrarily large image within another. Of course, this can be repeated to any number of levels, so that multiple arbitrarily large images can be embedded, one within the next, to obtain an arbitrarily large composite image.

Figure 3:
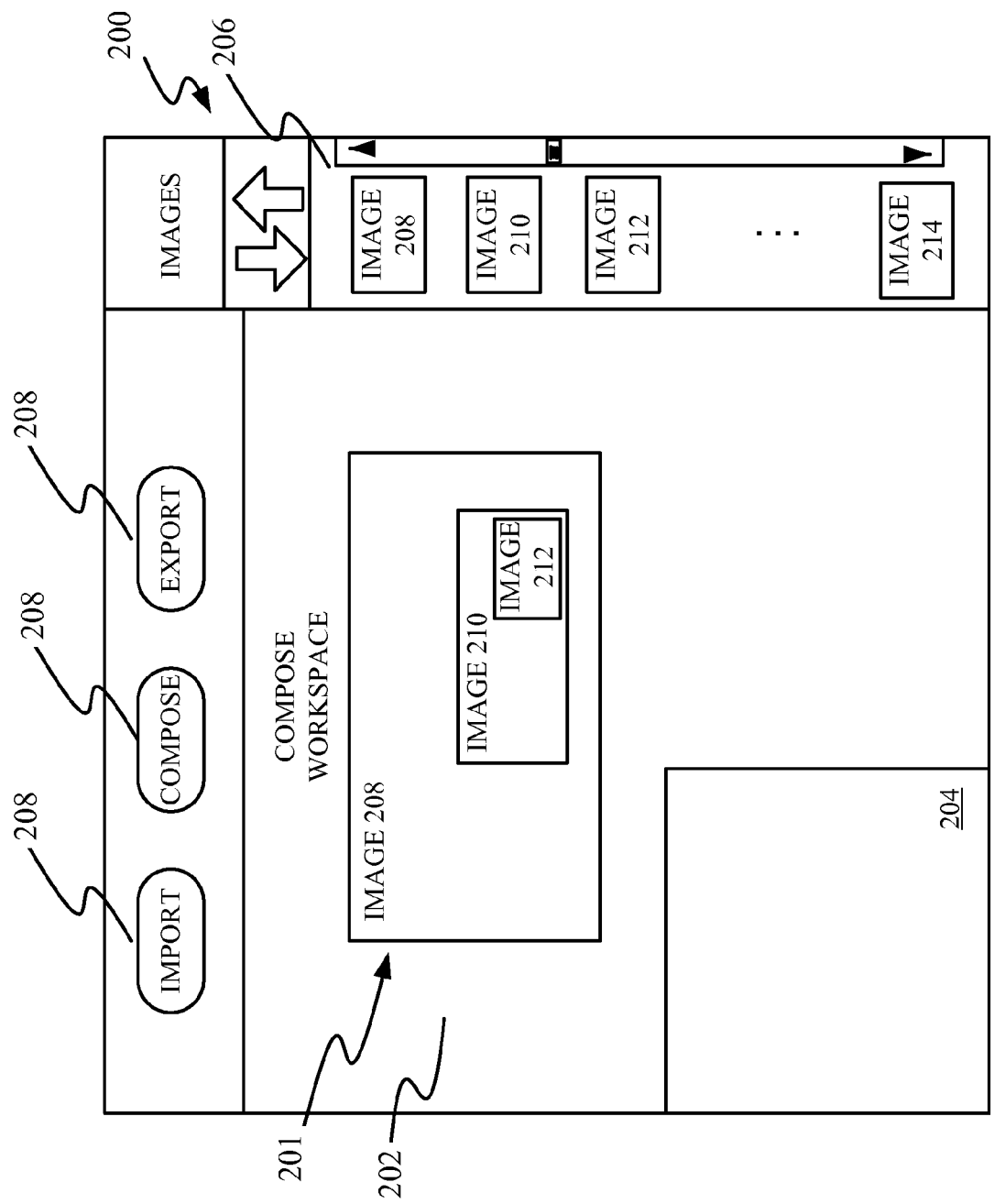
FIG. 3 is a representation of an image of one embodiment of a composition user interface.

In order to create the embedded images, image tile and pyramid generator 102 first receives an image collection 108 specified by a user through user interface component 104. This is indicated by block 150 in FIG. 2. FIG. 3 shows one illustrative embodiment of a display 200 generated by user interface component 104, in order to compose an image. Display 200 includes a composition work space 202, an optional image preview space 204, an image collection space 206 and a plurality of control buttons 208. The user can load the collection of images in space 206 for composition and editing within the composition workspace 202.

Next, the user selects individual images 208-214 for use in the composition. In doing so, in one embodiment, the user simply drags and drops images from collection space 206 to composition space 202, and places the dragged and dropped images in spatial relation to one another, as desired by the user. In the embodiment shown in FIG. 3, it can be seen that the user has positioned image 208 such that it contains an embedded image 210 which, itself, contains another embedded image 212. These images together, form a composite image 201. Providing (through user interface component 104) the user input selecting an image position for selected images and embedding images in the collection in other images within the collection is indicated by block 152 in FIG. 2.

It will be appreciated that the collection of images 206 can include multiple different images of widely different resolution. The images, when placed in composition workspace 202, can be overlapped or can be shrunk down and embedded within other images. The images within the collection can be dynamically rearranged by the user, simply by dragging and dropping the images about within composition workspace 202. Image information 110 in FIG. 1 represents the selected images, selected by the user for placement within the composition, and the position of those images relative to one another.

The collection of images, along with the image information 110, is provided to image tile and pyramid generator 102. Generator 102 then slices the images into tiles, and generates an image pyramid for each tile. As discussed in the background portion, the image pyramid is a way of organizing the image such that each representation of the image has a plurality of different tiles, and each tile is associated with another set of tiles of higher or lower resolution. By scanning through the various tiles, the user can view the image at different resolution levels. Tiling and creating an image pyramid for a single image is known. It should be noted, however, that the present system not only tiles and creates an image pyramid for the composite image 201 (containing images 208, 210 and 212) as shown in FIG. 3, but it also tiles and creates an image pyramid for each of the individual images 208, 210 and 212, that are contained in the composite image.

In other words, image 208 is tiled, by itself, and an image pyramid is created so that image 208 can be viewed in different resolutions. Similarly, image 210 is, itself, tiled and has its own image pyramid created for it such that it can be viewed in different resolutions as well. Further, image 212 is tiled and an image pyramid of different resolution images is created for it, as well. Slicing each image into tiles and generating an image pyramid for each of those tiles is indicated by blocks 154 and 156, respectively, in FIG. 2.

Figure 2A:
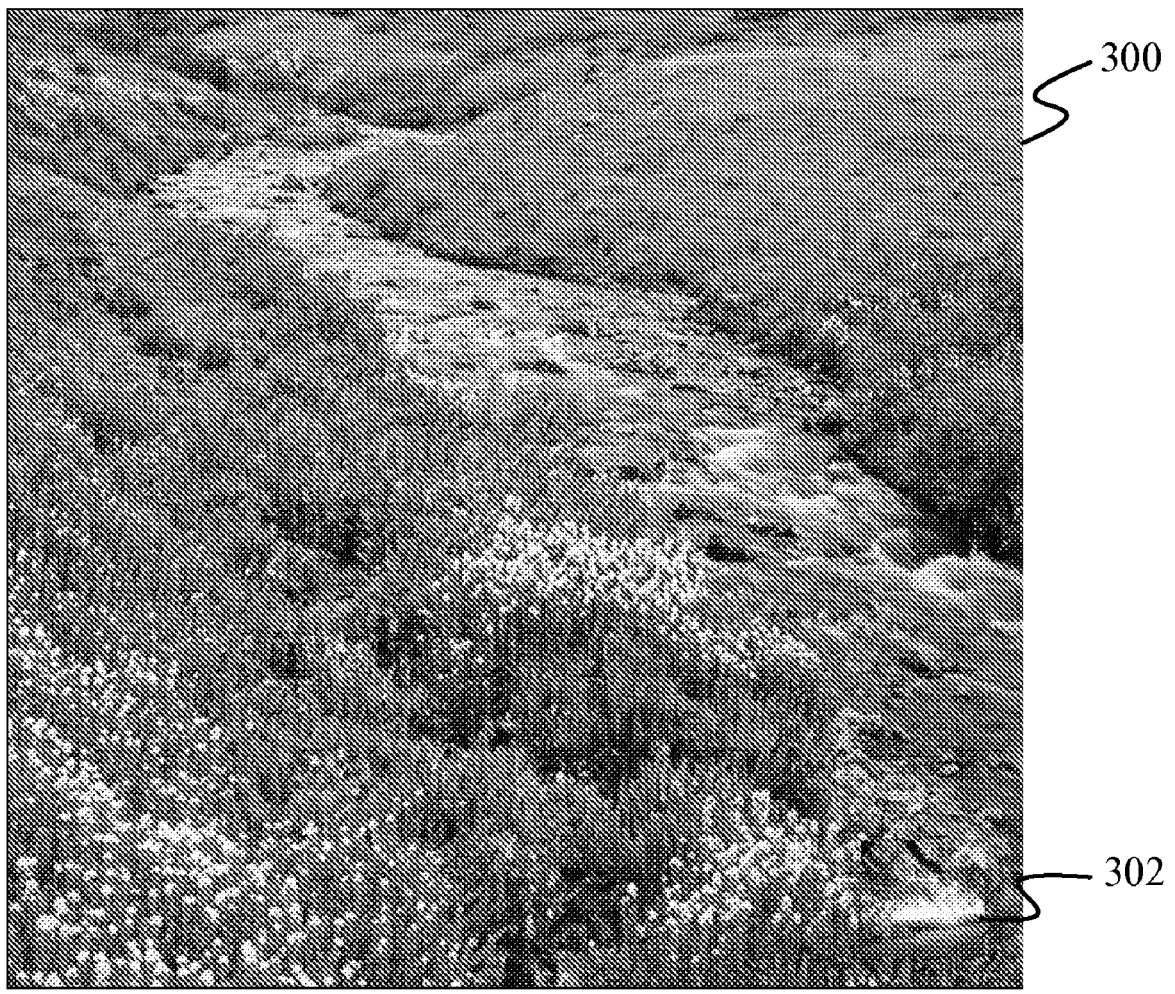
FIG. 2A is one embodiment of a composite image.
Figure 2B:
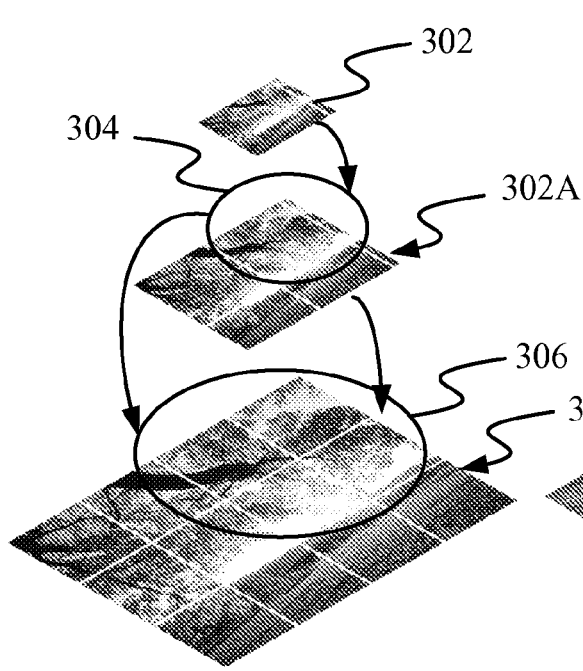
FIGS. 2B and 2C show image pyramids for both images in the composite image of FIG. 2A.
Figure 2C:
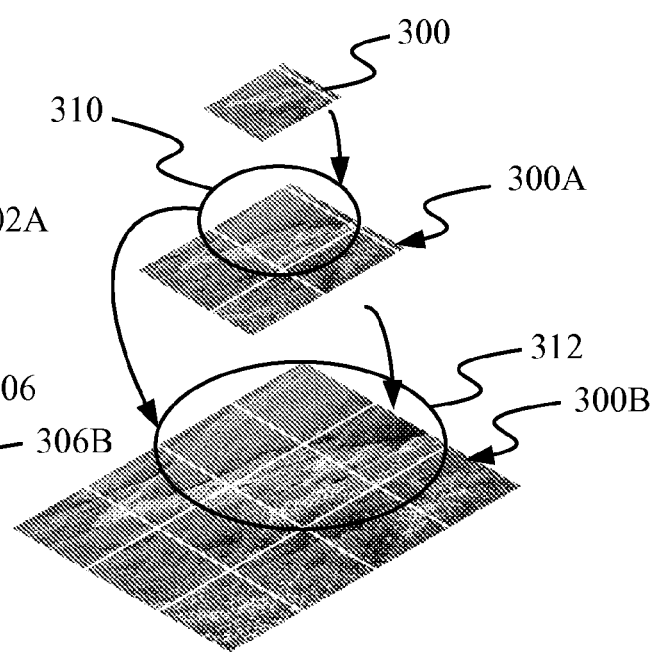

FIGS. 2A-2C illustrate this in more detail. FIG. 2A is a composite image that contains a first image 300 (which is the larger image in the composite) and a second image 302 (which is embedded within the larger image 300). As discussed above with respect to FIG. 2, image tile and pyramid generator 102 is provided with image information that identifies images 300 and 302 and indicates that image 302 has been shrunk and embedded within image 300. Image tile and pyramid generator 102 then takes each of the images 300 and 302 and tiles them, dividing them into a plurality of tiles, and then generates a pyramid for each of the tiles, wherein the pyramid contains a set of images of varying resolution.

FIG. 2B, for instance, shows that image 302, which is embedded in image 300, is first represented by a single tile. However, in order to generate the pyramid, the single tile shown at 302 is divided into four tiles represented by 302A in FIG. 2B. These tiles are associated with each other and together represent a higher resolution image than image 302. That is, each of the tiles 302A contains a higher resolution than the corresponding portion of FIG. 302. By way of example, the upper right quadrant of FIG. 302A is represented by a single tile and that tile has a higher resolution than the upper right quadrant of image 302. FIG. 2B also shows that each of the tiles in image 302A is again divided into additional tiles, each of which has a higher resolution than those in image 302A. This is represented by image 302B. It can be seen that the upper right tile 304 in image 302A has been divided into four tiles 306 in image 302B. Each of the four tiles 306 has a higher resolution then the single tile 304. This process can be continued, to any desired depth, in order to obtain a set of images that form a high resolution representation of image 302.

FIG. 2C shows that the same processing occurs with respect to image 300. In other words, image 300 is divided into a plurality of tiles within image 300A. Each of those tiles is also divided into a plurality of tiles in image 300B. For instance, the upper right hand tile 310 in image 300A is divided into four, higher resolution tiles 312, shown in image 300B.

After each of the images in the composite image composed by the user has been tiled and had an image pyramid generated for it, the images are linked to one another by image tile and pyramid generator 102 so that, when the information corresponding to composite image is retrieved, the composite image will be rendered for viewing by the user. Generating the composite image with arbitrarily large images shrunk down and embedded within other arbitrarily large images is indicated by block 158 in FIG. 2.

In the embodiment shown in FIG. 3, once the composite image has been composed, the user simply actuates the "Export" button on display 200, and image tile and pyramid generator 102 generates a hierarchical folder tree and associated directly with each folder in the tree containing a set of images representing different resolutions of a portion of the composite image composed by the user. The directories and folders for the embedded images are shown at 112 in FIG. 1, and generating the hierarchical folder tree and folders is indicated by block 160 in FIG. 2.

In one embodiment, when the final image is exported, image tile and pyramid generator 102 creates a graph XML file indicating the location, size, z-order and aspect ratio of the images. The directory is created with folders for each image. A series of tiles is generated at a number of different zoom levels. For instance, an image at zoom level 11 may have 20 different tiles. These tiles in the pyramid correspond to a multi-scale image created for the original image.

FIG. 3 also shows that, in one embodiment, preview portion 204 shows a preview of the images, as they are arranged on the composition workspace 202.

Figure 4:
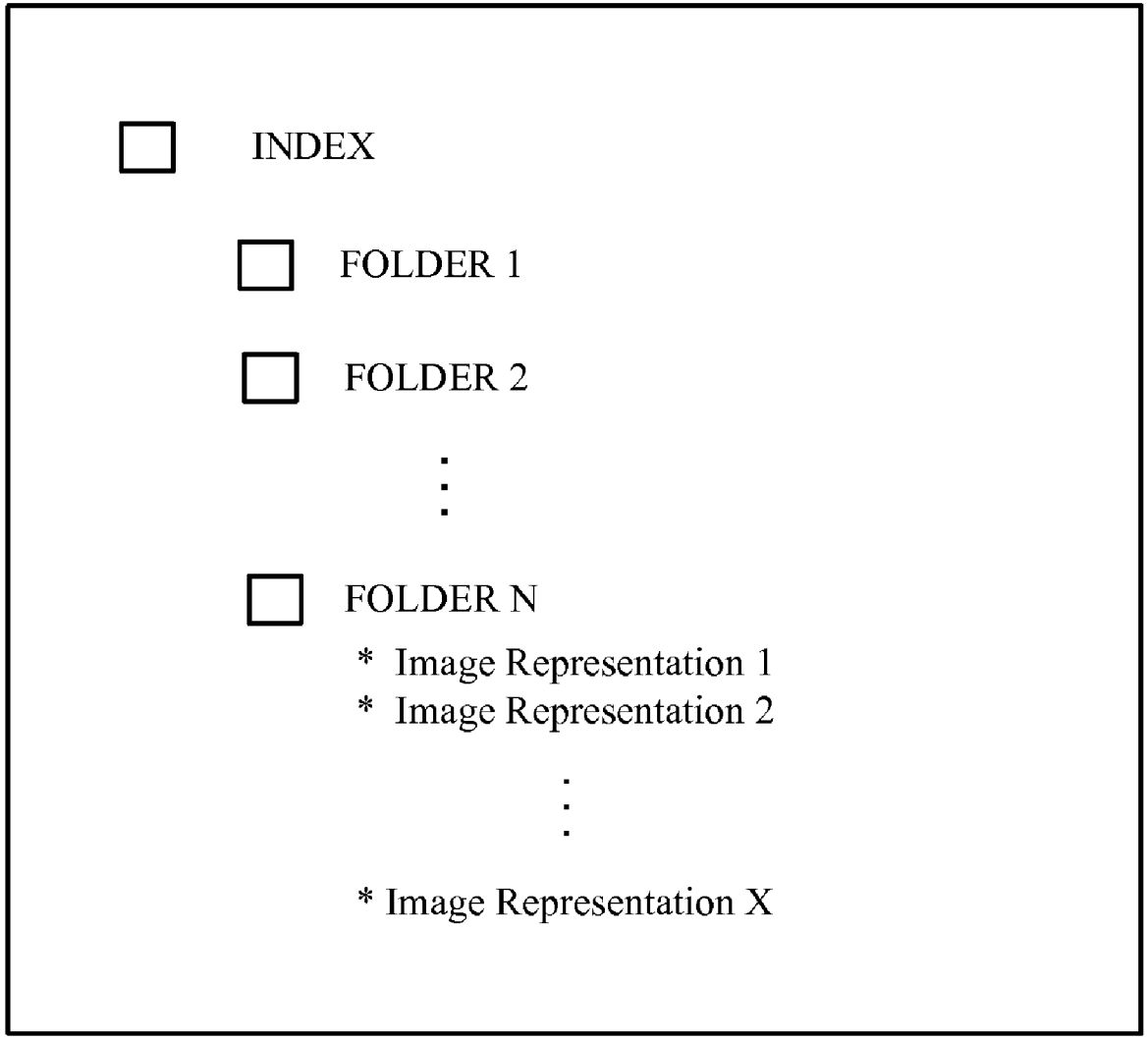
FIG. 4 is a representation of an output of the image processing system shown in FIG. 1 after a composite image has been composed.

FIG. 4 shows a more detailed, illustrative, embodiment of a hierarchical folder tree output by image tile and pyramid generator 102. It can be seen that each folder contains a portion of a final image arrangement composed by the user on the composition space 202. In the embodiment shown in FIG. 3, the final arrangement includes images 208, 210 and 212, embedded within each other as shown. Directories and folders also include an index to the folder tree that can be used in retrieving desired slices of the composite image. Outputting an index to the folder tree is indicated by block 162 in FIG. 2.

Image tile and pyramid generator 102 then stores the folder tree and index for the composite image in embedded image store 106, for later processing. This is indicate by block 104 in FIG. 2.

It will also be noted that image composition/editing user interface component 104 can be used to edit the images in the composite image 201. A user can simply select a portion of composite image 201 to zoom into. For instance, if the user selects image 212, the user can zoom into image 212 such that it is displayed at high resolution. The user can then edit the image, as desired, and resave the composite image. Image tile and pyramid generator 102 repeats the process of generating tiles and an image pyramid for the newly edited image, as discussed above with respect to the original image 212.

Figure 5:
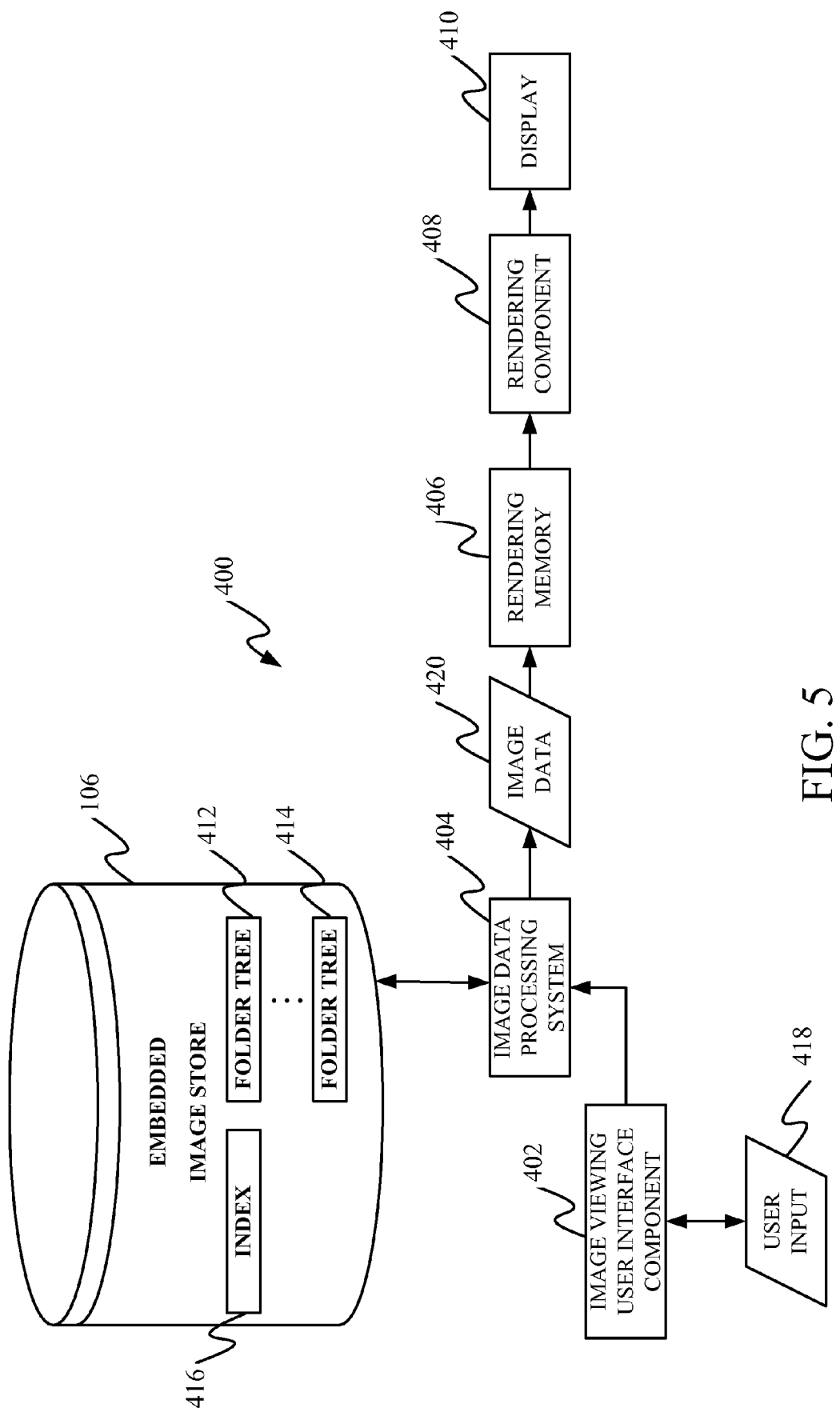
FIG. 5 is a block diagram of one embodiment of an image rendering system.

FIG. 5 is a block diagram of one embodiment of an image rendering system 400 which can be combined with, or separate from, system 100 shown in FIG. 1. System 400 includes image viewing user interface component 402, image data processing system 404, rendering memory 406, rendering component 408 and display 410. FIG. 5 also shows that system 400 is coupled to embedded image store 106. In the embodiment shown in FIG. 5, embedded image store 106 has a plurality of hierarchical folder trees 412-414, and an index 416 to the folder trees 412-414.

In order to render an image, a user provides a user input 418 to image viewing user interface component 402. The user input identifies a composite image for rendering. In response, image data processing system 404 retrieves the desired folder tree, by accessing index 416, and provides image data 420, representing the selected image, to rendering memory 406. A rendering component 408 then renders the selected image on display 410 using the image data 420 stored in rendering memory 406.

Figure 6:
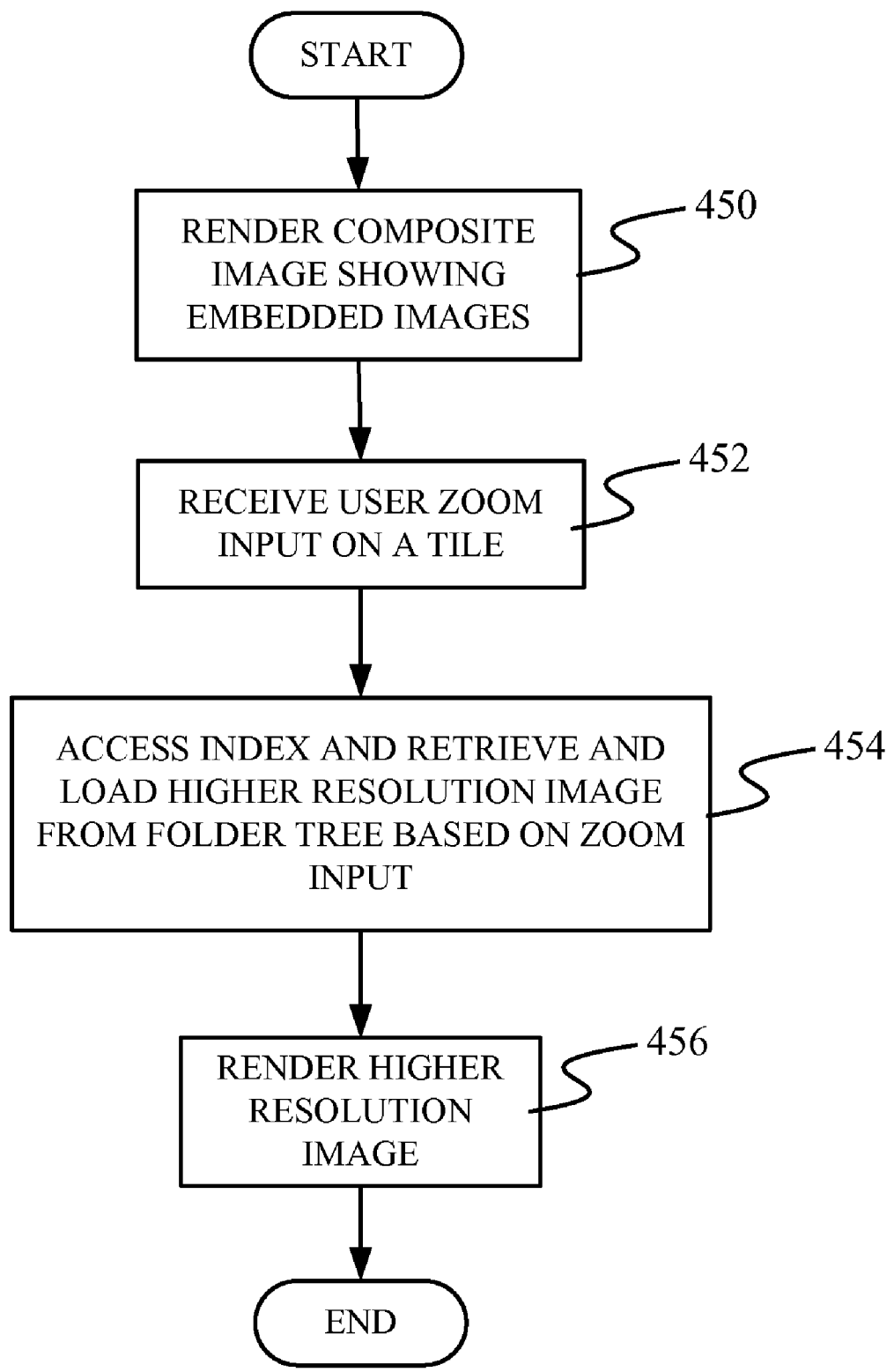
FIG. 6 is a flow diagram illustrating one embodiment of the overall operation of the system shown in FIG. 5.

FIG. 6 is a flow diagram illustrating the operation of system 400 in rendering a portion of the composite image by having the user zoom into that portion of the composite image. Of course, the same process can be used to pan or zoom out as well. First, the user selects the composite image for rendering, and the composite image is rendered, as just discussed. Rendering the composite image, showing embedded images, is indicated by block 450 in FIG. 6.

Next, the user provides another user input 418 selecting a portion of the composite image to zoom into. For instance, in the composite image 201 shown in FIG. 3, the user may select any portion of image 208, image 210, or image 212, for zooming. Assume for the sake of discussion that the user has selected image 212, from the rendered composite image 201, and the user wishes to zoom into image 212. Receiving the user zoom input on a given tile (the tile containing image 212) of composite image 201 is indicated by block 452 of FIG. 6.

Image viewing user interface component 402 provides tile and zoom information to image data processing system 404. The tile and zoom information identifies the tile that the user has selected and indicates that the user wishes to zoom into that tile, or new it at a higher resolution. Image data processing system 404 then accesses index 416, with the identification of the tile provided by the user. Index 416 directs system 404 to a specific folder tree 412-414 that contains a folder of higher resolution images for the selected tile. Based on the particular zoom input, which indicates how far the user wishes to zoom into image 212, image data processing system 404 retrieves the appropriate folder from the given folder tree and loads the higher resolution representation of the image identified by that folder, as image data 420, into rendering memory 406. This is indicated by block 454 in FIG. 6.

By way of example, assume that the user simply wishes to obtain the next higher resolution representation of image 212. In that case, image data processing system 404 simply accesses (through index 416) the folder in the specified folder tree 412-414, that contains the next highest resolution representation of the selected tile in image 212, and loads that into rendering memory 406, for rendering on display 410.

Alternatively, however, the user may provide a zoom input indicating that the user wishes to jump a number of levels into image 212. In that case, the user will indicate that the user wishes to view not the next highest resolution representation of image 212, but, perhaps, the third or fourth next highest resolution representation of image 212. In one embodiment, the system also provides a shortcut feature. For instance, a user may select a particular resolution level for a given image, and assign that resolution level to a specific key or keystroke combination on a keyboard. The user may then, when the composite image containing the shortcut is rendered, input the keystroke or keystroke combination, and shortcut to the particular image resolution level specified by the shortcut. In either case, the representation having the desired resolution is retrieved and rendered. Rendering the higher resolution image is indicated by block 456 in FIG. 6.

Figure 7:
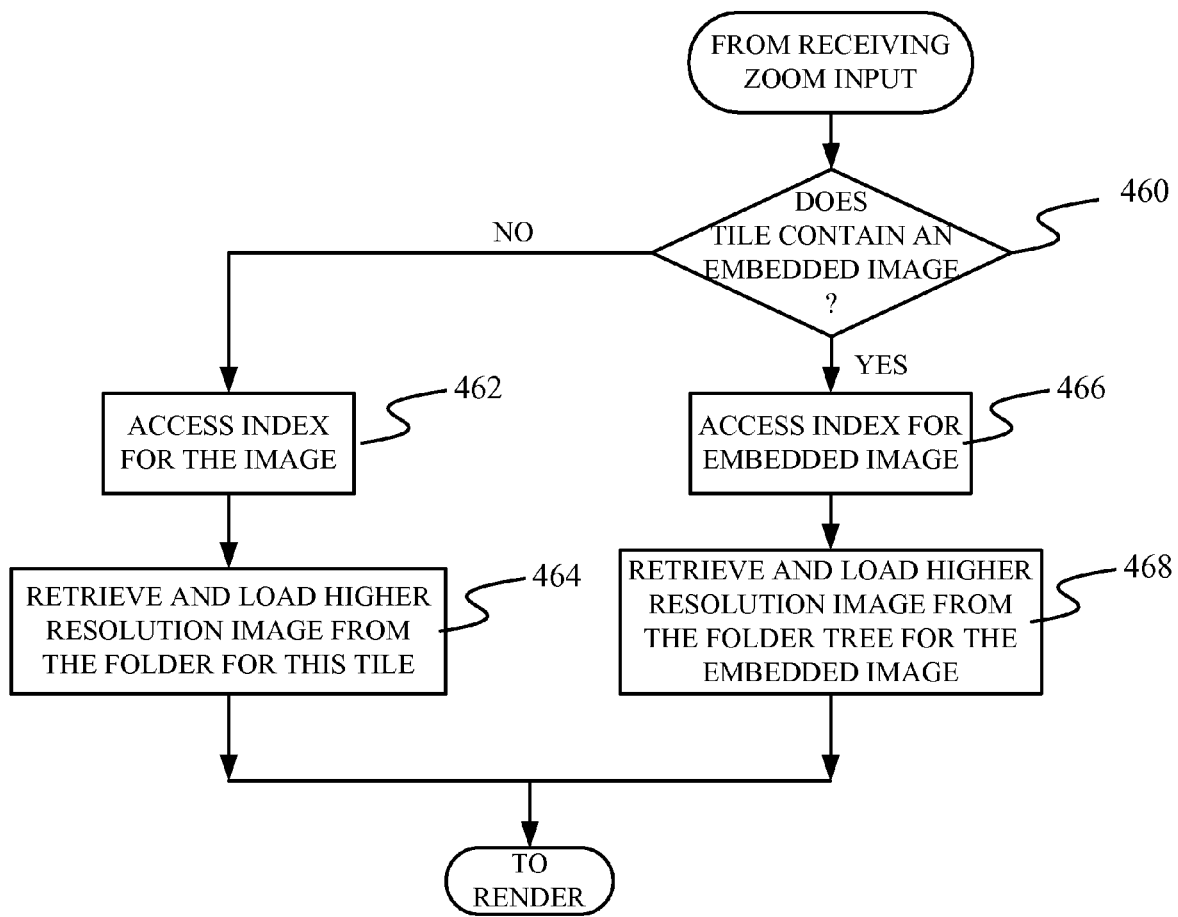
FIG. 7 is a more detailed block diagram illustrating how embedded images are obtained, at higher resolution, for rendering.

FIG. 7 is a flow diagram illustrating one embodiment of the operation of image data processing system 404 in greater detail. Once system 404 has received the user input indicating that the user wishes to zoom into a tile of the displayed image, system 404 determines whether that tile contains an embedded image. This is indicated by block 460 in FIG. 7. If not, then system 404 simply retrieves the next highest resolution representation of that tile from embedded image store 106 through index 416. Accessing the index is indicated by block 462 in FIG. 7, and retrieving and loading the higher resolution image from the folder for the specified tile is indicated by block 464.

If, at block 460, the tile specified by the user for zooming does contain an embedded image, then system 404 accesses index 416 for the embedded image in the tile. This is indicated by block 466 in FIG. 7. System 404 then retrieves and loads the higher resolution representation of the embedded image from the folder tree for the embedded image, which is specified by the index 416. This is indicated by block 468 in FIG. 7.

In either case, once the higher resolution representation of the tile has been retrieved at blocks 464 or 468, it is loaded as image data 420 into rendering memory 406 for rendering on display 410 by rendering component 408.

It can thus be seen that the system allows the creation of arbitrarily deep, and arbitrarily large images, having an arbitrarily high degree of resolution. By embedding a series of images within other images, substantially any view of a composite image can be created from a small subset of tiles from the image pyramids associated with the individual images in the composite image. It will also be noted that, even through the composite image may be formed of content that is extremely large, the present system allows for zooming into a given tile of the image, or embedded image, so that only the information representing that tile needs to be loaded into memory at any given time. This provides for efficient memory and space management, no matter what size content is used in generating the composite image. This allows the system to maintain high performance in spite of the large size of the content used in generating the composite image.

The system has a large number of practical applications. One example of such applications is in advertising. For instance, an advertising image may be displayed on a smaller portion of a given user interface display. However, the user may desire more information than can be displayed on a given advertising display area. Therefore, by simply clicking on the image, the image can be expanded to display a great deal more advertising information than can originally be displayed on the original image. This can all be done without changing the size of the advertising display area. Instead, the display area can simply be used to display a higher resolution image of a portion of the advertisement.

For instance, assume that the advertisement is for an automobile. When the user clicks on the automobile, a high resolution image of the interior or exterior of the given automobile can be displayed, instead of simply an advertising banner.

Alternatively, if the user clicks on the display, a plurality of different automobiles may be displayed on a plurality of different tiles. Then, when the user clicks on one of those tiles to zoom into a given model of automobile, a high resolution image of that automobile can be displayed in the same advertising space. In addition, if a user then clicks on one of the tiles in that image, a high resolution image of a portion of the automobile being displayed can then be presented to the user. Of course, this can be continued, ad infinitum as long as higher resolution images of the automobile have been created in an image pyramid, for the automobile.

Figure 8:
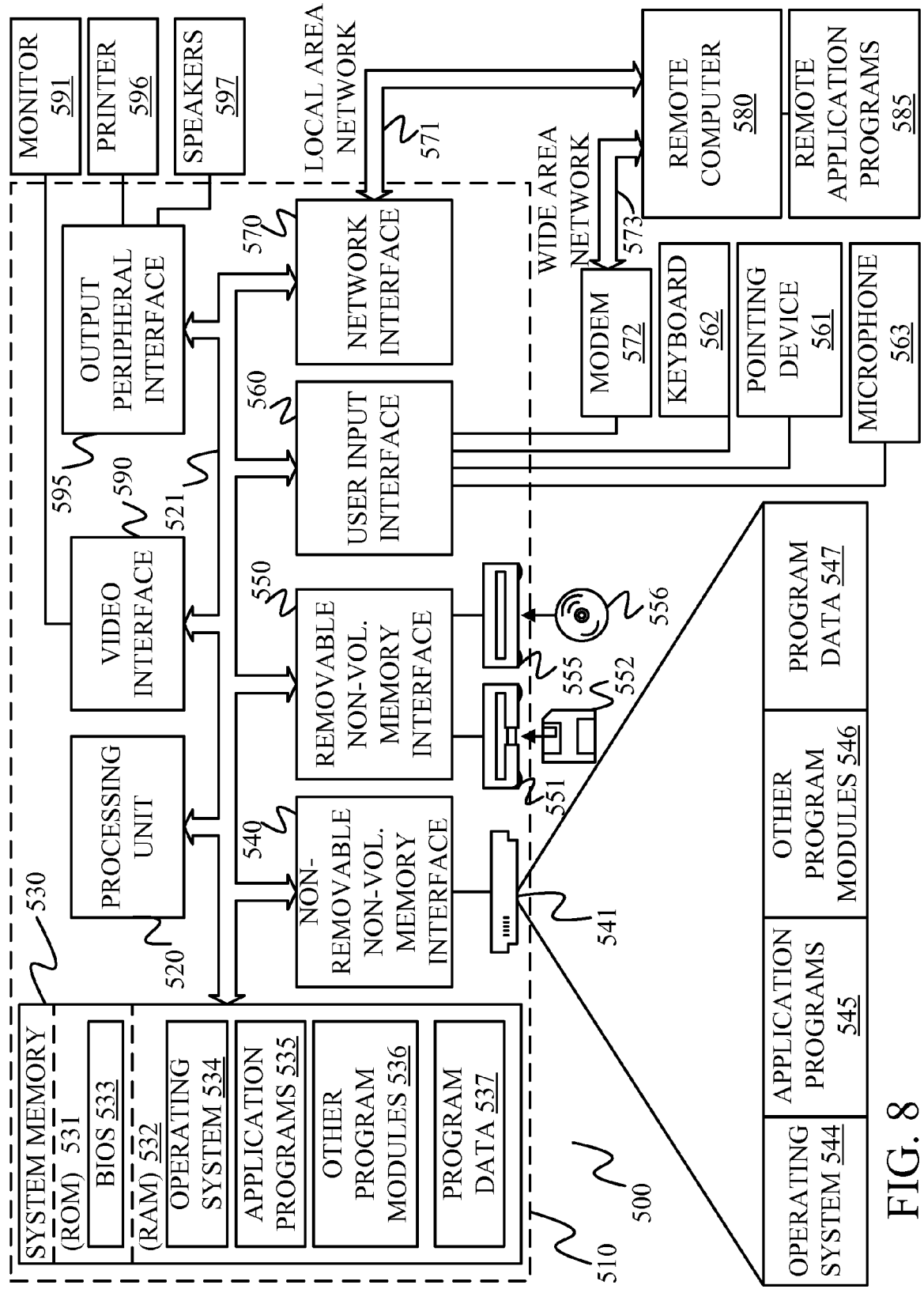
FIG. 8 is a block diagram of one illustrative embodiment of a computing environment.

FIG. 8 illustrates an example of a suitable computing system environment 500 on which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 8 illustrates operating system 534, application programs 535, other program modules 536, and program data 537.

The computer 510 may also include other removable/non-removable volatile/nonvolatile computer storage media. By way of example only, FIG. 8 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 8, provide storage of computer readable instructions, data structures, program modules and other data for the computer 510. In FIG. 8, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. Systems 100 and 400, discussed above, can reside in programs 545, modules 546, or elsewhere, including remotely.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 8 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 8 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of generating images on a display of a computer system, comprising:
   receiving an input indicative of a user positioning a first image embedded inside a second image;
   dividing each of the first and second images into tiles;
   generating a first image pyramid for the first image and a second image pyramid for the second image, the first image pyramid including a plurality of different representations of the first image at different resolutions, the second image pyramid including a plurality different representations of the second image at different resolutions;
   generating a composite image with the first image being embedded inside the second image; and
   storing the composite image for rendering on the display.

2. The method of claim 1 wherein storing comprises:
   generating a folder tree with a plurality of folders, each folder in the tree including a set of images from one of the first and second image pyramids.

3. The method of claim 2 and further comprising:
   generating an index to the folder tree.

4. The method of claim 3 and further comprising:
   receiving a user selection input selecting the composite image; and
   rendering the composite image.

5. The method of claim 4 and further comprising:
   receiving a zoom input indicating a user selection input to zoom into a tile in the composite image.

6. The method of claim 5 and further comprising:
   determining whether the tile includes the embedded image;
   if so, retrieving a higher resolution representation of the first image from the folder tree; and
   rendering the higher resolution representation of the first image.

7. The method of claim 6 wherein retrieving the higher resolution image of the first image comprises:
   accessing the index to identify a folder containing the higher resolution representation; and
   retrieving the higher resolution representation from the identified folder.

8. An image processing system, comprising:
   an image user interface component receiving a collection of images and a position input indicating positions of images in the collection relative to one another in a composed image, the composed image including at least a first image embedded within a second image;
   an image tile and pyramid generator receiving the image collection and the position input and generating a first folder for the first image and a second folder for the second image, the first folders containing a plurality of representations of the first image, at a plurality of different resolutions, and the second folder containing a plurality of representations of the second image at a plurality of different resolutions; and
   an embedded image store storing the first and second folders, and a composite image having the first image embedded within the second image.

9. The system of claim 8 wherein the image tile and pyramid generator generates the first and second folders as hierarchical folder trees having folders at different levels in the hierarchical folder trees, the folders at a given level in a tree containing representations of an image at a resolution different from folders at a different level in the tree.

10. The system of claim 9 wherein the tile and pyramid generator generates an index to the hierarchical folder trees.

11. The system of claim 10 and further comprising:
    an image data processing component and a rendering component, the image data processing component accessing the embedded image store and providing image data indicative of the composite image to the rendering component, the rendering component rendering the composite image with the first image embedded within the second image.

12. The system of claim 11 and further comprising:
    an image viewing user interface component receiving a resolution change input indicating a desired change in resolution of the composite image rendered and providing the resolution change input to the image data processing component, the image data processing component retrieving image data corresponding to a representation of a portion of the composite image that has a different resolution from the composite image being rendered.

13. The system of claim 12 wherein the portion of the composite image comprises the first image embedded within the second image.

14. The system of claim 13 wherein the resolution change input comprises a zoom input and wherein the image data corresponding to a portion of the composite image comprises a representation of the first image having a higher resolution than the resolution of first image when rendered as a portion of the composite image embedded within the second image.

15. An image processing system, comprising:
   an image composition and viewing user interface component configured to receive a collection of arbitrarily large images and generate a composite image with a first of the images embedded within a second of the images;
   an image tile and pyramid generator configured to generate a plurality of different resolution representations of the first and second images; and
   a rendering component configured to render the composite image, wherein the image composition and viewing user interface component is configured to receive a user zoom input and wherein the rendering component is configured to zoom into a selected portion of the composite image by rendering one of the plurality of different resolution representations based on the user zoom input.

16. The system of claim 15 and further comprising:
   an embedded image store configured to store the plurality of different resolution representations.

17. The system of claim 16 and further comprising:
   an image data processing system configured to receive the user zoom input from the image composition and viewing user interface component and retrieve the one of the different resolution images for rendering, from the embedded image store, based on the user zoom input.

18. The system of claim 15 wherein the image composition and viewing user interface component displays a composition workspace and an image collection space and receives a first user drag and drop input indicative of a user selecting a given image from the image collection space and moving it to the composition workspace, and a second user drag and drop input indicative of the user selecting a second given image from the image collection space and positioning it on the composition workspace to be embedded within the first given image and wherein the composite image is generated based on the first and second user drag and drop inputs.

19. The system of claim 15 wherein the image composition and viewing user interface component includes an export control that causes the image tile and pyramid generator to generate the plurality of different resolution representations for the given images in the composite image.

20. The system of claim 15 wherein the image tile and pyramid generator generates the plurality of different resolution representations as images in folders at different levels in a hierarchical folder tree.

* * * * *